(12) United States Patent
Upadhyay et al.

(10) Patent No.: US 11,797,941 B2
(45) Date of Patent: Oct. 24, 2023

(54) SYSTEM AND METHODOLOGIES FOR CANDIDATE ANALYSIS UTILIZING PSYCHOMETRIC DATA AND BENCHMARKING

(71) Applicant: WIZEHIRE, INC., Houston, TX (US)

(72) Inventors: Siddharth S. Upadhyay, Houston, TX (US); James N. Niblick, Royersford, PA (US)

(73) Assignee: WizeHire, Inc., Houston, TX (US)

( * ) Notice: Subject to any disclaimer, the term of this patent is extended or adjusted under 35 U.S.C. 154(b) by 125 days.

(21) Appl. No.: 17/095,468

(22) Filed: Nov. 11, 2020

(65) Prior Publication Data

US 2021/0174307 A1 Jun. 10, 2021

Related U.S. Application Data

(60) Provisional application No. 62/933,744, filed on Nov. 11, 2019.

(51) Int. Cl.
*G06Q 10/1053* (2023.01)
*G06Q 10/0639* (2023.01)
*G06N 20/00* (2019.01)

(52) U.S. Cl.
CPC ......... *G06Q 10/1053* (2013.01); *G06N 20/00* (2019.01); *G06Q 10/06393* (2013.01); *G06Q 10/06398* (2013.01)

(58) Field of Classification Search
CPC ......... G06Q 10/1053; G06Q 10/06393; G06Q 10/06398
See application file for complete search history.

(56) References Cited

U.S. PATENT DOCUMENTS

| | | | | |
|---|---|---|---|---|
| 11,062,267 | B1* | 7/2021 | Toomey | H04L 67/01 |
| 2013/0065208 | A1* | 3/2013 | Glass | G09B 7/02 |
| | | | | 434/236 |
| 2014/0122355 | A1* | 5/2014 | Hardtke | G06Q 10/1053 |
| | | | | 705/321 |
| 2015/0161567 | A1* | 6/2015 | Mondal | G06Q 10/1053 |
| | | | | 705/321 |
| 2020/0342384 | A1* | 10/2020 | Iyer | G06Q 10/1053 |
| 2020/0342410 | A1* | 10/2020 | Iyer | G06Q 10/1053 |

OTHER PUBLICATIONS

Techopedia "Straw Man" as archived Oct. 24, 2011 ,available at: https://web.archive.org/web/20111024195710/https://www.techopedia.com/definition/14585/straw-man (Year: 2011).*

Stark, Stephen, et al. "Examining assumptions about item responding in personality assessment: Should ideal point methods be considered for scale development and scoring?." Journal of Applied Psychology 91.1 (2006): 25. (Year: 2006).*

Thorat, Shashikant G., Amol P. Bhagat, and Kiran A. Dongre. "Neural network based psychometric analysis for employability." 2018 International Conference on Research in Intelligent and Computing in Engineering (RICE). IEEE, 2018. (Year: 2018).*

Yarkoni, Tal, and Jacob Westfall. "Choosing prediction over explanation in psychology: Lessons from machine learning." Perspectives on Psychological Science 12.6 (2017): 1100-1122. (Year: 2017).*

* cited by examiner

*Primary Examiner* — Brendan S O'Shea
(74) *Attorney, Agent, or Firm* — Barnes & Thornburg LLP (57) ABSTRACT

A system and various methodologies provide the ability to analyze qualifications and capabilities of one or more candidates for employment.

20 Claims, 7 Drawing Sheets

Tell us about the job

For Consultants:

Job Title(s)*

Reports To

Attach a sample Job Description

[ Choose File ]  No file chosen

Consultant Notes:

FIG. 3A

To the right are four items, each describing a desirable trait in the ideal employee for this role. By clicking and dragging each item, move them from the left to the right and order them so they are ranked MOST important for the job to LEAST important for the job. The final order should represent how rank these behaviors from most desirable (on top) to least desirable (on the bottom).

You can also move items around to adjust their order until you feel it is most accurate before clicking, "Submit."

Move Terms from Here     Most Like The Ideal Employee

Accurate

Confident

Considerate

Decisive

Least Like The Ideal Employee
*********
← 176

← 174

Privacy Policy      ← 172

Move Terms from Here

Most Like Me

- Accurate
- Confident
- Considerate
- Decisive

Least Like Me

To the right are four items, each representing a certain behavior. By clicking and dragging each item, move them from the left to the right and order them so they are ranked MOST like you to LEAST like you. The final order should represent how you rank these behaviors from most like you (on top) to least like you (on the bottom).

You can also move items around to adjust their order until you feel it is most accurate before clicking "submit."

Thanks and enjoy!

Privacy Policy

SYSTEM AND METHODOLOGIES FOR CANDIDATE ANALYSIS UTILIZING PSYCHOMETRIC DATA AND BENCHMARKING

COPYRIGHT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

CROSS-REFERENCE TO RELATED APPLICATIONS

This application claims priority under 35 U.S.C. § 119(e) to U.S. Provisional Application Ser. No. 62/933,744, filed Nov. 11, 2019, which is expressly incorporated by reference herein.

FIELD

The present disclosure relates to systems, components, and methodologies for analyzing the qualifications and capabilities of one or more employment candidates.

BACKGROUND

Conventionally, many organizations perform executive search services that include researching the availability of suitable candidates. These search firms may act as intermediaries to identify potential candidates and/or analyze candidates' interest, qualifications or expertise.

Conventionally, both identification of potential candidates and hiring decisions have been based on incomplete data and/or personal subjective opinion (e.g., self-written resumes and personal interviews). Nevertheless, certain personality traits that play a significant role in determining an individual's success in a given task/job may be intangible and not easily identified in such situations.

SUMMARY

As a result, in such situations, analysis and hiring decisions should be based on more complete, objective data pertaining to candidates' interests, qualifications, skills, experience and expertise as well as identification of candidate personality traits that enable success in a particular job.

In accordance with at least some embodiments, such personality traits may be validated using one or more psychometric tools to identify and measure the presence of such traits in employment candidates.

In accordance with at least some embodiments, systems, components and methods are provided for analyzing the interests, skills, experience, qualifications and capabilities of one or more employment candidates in a manner that enables matching employment candidates to specific job roles by utilizing a benchmarking process that incorporates these variables. In accordance with at least some embodiments, a benchmarking process is also used to further improve the ability to accurately match employment candidates to specific job roles. In accordance with at least some embodiments, a system and methodologies formulate an objective benchmark utilizing a reverse psychometric model.

In accordance with at least some embodiments, the benchmarking process and formulation may include psychometric scores (i.e., psychometrics), as well as scoring data pertaining to candidate fit against other relevant job attributes (e.g., screening questions, experience, skills test scores, cultural preference, etc.), wherein all of the data are combined into a single "fit score" that provides a holistic and representative, quantitative data regarding a candidates overall fit for a particular role.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

In accordance with at least some embodiments, such personality traits may be validated using one or more psychometric tools to identify and measure the presence of one or more character or personality traits in employment candidates so enable matching employment candidates to specific job roles utilizing psychometric data.

Conventionally, hiring decisions have been based on incomplete data and/or personal subjective opinion (e.g., self-written resumes and personal interviews). Nevertheless, certain personality traits, experiences, skills and interests that play a significant role in determining an individual's success in a given task/job are sometimes intangible and not easily identified in such situations.

Without analysis of those traits being incorporated into the hiring decision, the accuracy of the placement of an individual in a role is often times low, leading to poor performance and job dissatisfaction. When these traits are identified and consideration of the traits is incorporated into the hiring decision, overall job performance and match can be improved.

Accordingly, disclosed embodiments provide a formalized mechanism by which hiring managers can incorporate analysis of these psychometric traits into the hiring decision.

In accordance with disclosed embodiments, a system and methodologies are provided to analyze and rank employment candidates in such a way that predicts an individual candidate's fit to a particular job. However, effective determination and use of such personality trait data requires validated psychometric tools to identify and measure that data. The defining feature of this approach is its empirical foundation. The term "psychometric" simply refers to the quantitative assessment of psychological states/abilities. Contemporary psychometric tests consist of varied subtests that tap diverse aspects of a defined construct of traits and characteristics. For example, scales may include subtests that sample a more specific set of traits (e.g., extraversion, empathy, pro-activeness, detail-orientation) and require the examinee to rank order statements (i.e., proxy statements) that represent the underlying constructs in a way that prevents the examinee from arbitrarily influencing or skewing the results. The resulting rankings represent an objective representation of their behavioral preferences and tendencies.

At the heart of psychometric testing lies norm referencing (Sattler 1992). Norm referenced tests are developed by administering items in a standardized manner to a representative sample of the population in question. The norm sample is considered 'representative' insofar as it is stratified within different groups for variables that might influence performance differentially (e.g., gender, geographic region, ethnic status, community size, etc.). Scores are scaled such that each individual's derived score represents a relative standing within the norm or standardization group. In this sense, psychometric testing is an empirical endeavor in its purest sense.

At least some disclosed embodiments utilize an artificial intelligence-driven automated comparison to a benchmark to improve objectivity and accuracy of analysis.

In accordance with at least one implementation, this may be accomplished by capturing personality trait data for one or more personality traits from a targeted population, studying that data to determine an ideal "benchmark" for the one or more traits and automatically comparing unlimited candidates against that benchmark to arrive at a comparative job/fit score ranging across a customized continuum, e.g., from excellent, very good, average or poor, or other similar categorizations of employment candidate job fit.

A particular technical utility is provided by the disclosed embodiment's use of a psychometric approach to building benchmarks as a result of the nature of psychometrics to begin with. Such an approach to building benchmarks takes advantage of the reliability and validity predictors of performance (Sattler 1992). The term "reliability" refers to consistency of measurement; the more reliable a measure, the less error involved in estimates derived from it. When done well, psychometric tests boast extremely high internal reliability (the degree to which each component score of the test correlates with the full test score) and short-term 'test-retest' reliability (an index of stability derived by administering the test to the same group of individuals more than once). The validity of these tests, too, has proven to be strong. The term "validity" refers to the extent to which a test measures what it was designed to measure.

Thus, in implementation, disclosed embodiments are based on examination of a single role/job for which a benchmark is to be formulated. Benchmarks may be formulated, or established, through a three-stage process which is a combination of subject matter expert feedback, statistical comparisons and use of a Psychometric Benchmark Instrument ("PBI").

For example, in a subject matter expert feedback stage, thought leaders and practitioners trained in the psychometric profiles, and with industry experience in the role, may provide input on which personality traits are most important for success in a given role/job. These experts may be both proficient in the analysis of personality profiles and potentially have experience in a particular industry and/or job/role. To some extent, this phase receives subjective input because analysis may be performed based on subjective analysis of one or more personality traits and how those traits affect job/role/task performance.

Thereafter, statistical comparisons of personality traits may be performed from a cohort of top and bottom performers for a job/role/task. It should be appreciated that this phase of the analysis provides an objective input. Data for analysis may be obtained from personality profile data from a database of individuals in a particular role; thereafter, statistical analysis may be performed to determine statistically significant correlations between traits and performance. Optionally, an adjustment may be made for distribution in the population to normalize the benchmark so it is neither overly punitive (i.e., too small a percentage of the population would score high) nor too forgiving (i.e., too large a percentage of the population would score high).

Subsequently, the PBI may be used to enable key stakeholders from the particular industry being analyzed to provide input. For example, this phase may include individuals excelling in a particular job/role and/or managers of those individuals to complete the PBI to generate psychometric input). In at least one implementation, the PBI stakeholders may be tasked with rank ordering a series of statements that represent the core dimensions of a personality profile. Proxy statements may be used to hide core dimensions of the assessment and substitute every day observable behaviors so as to reduce subjective bias. These rankings may be scored using computer algorithms that contribute significantly to determining final scores in the benchmark. Such final scores may be used to make predictive statements about the candidate's fit and future performance in the particular job/role.

Figure 3A:
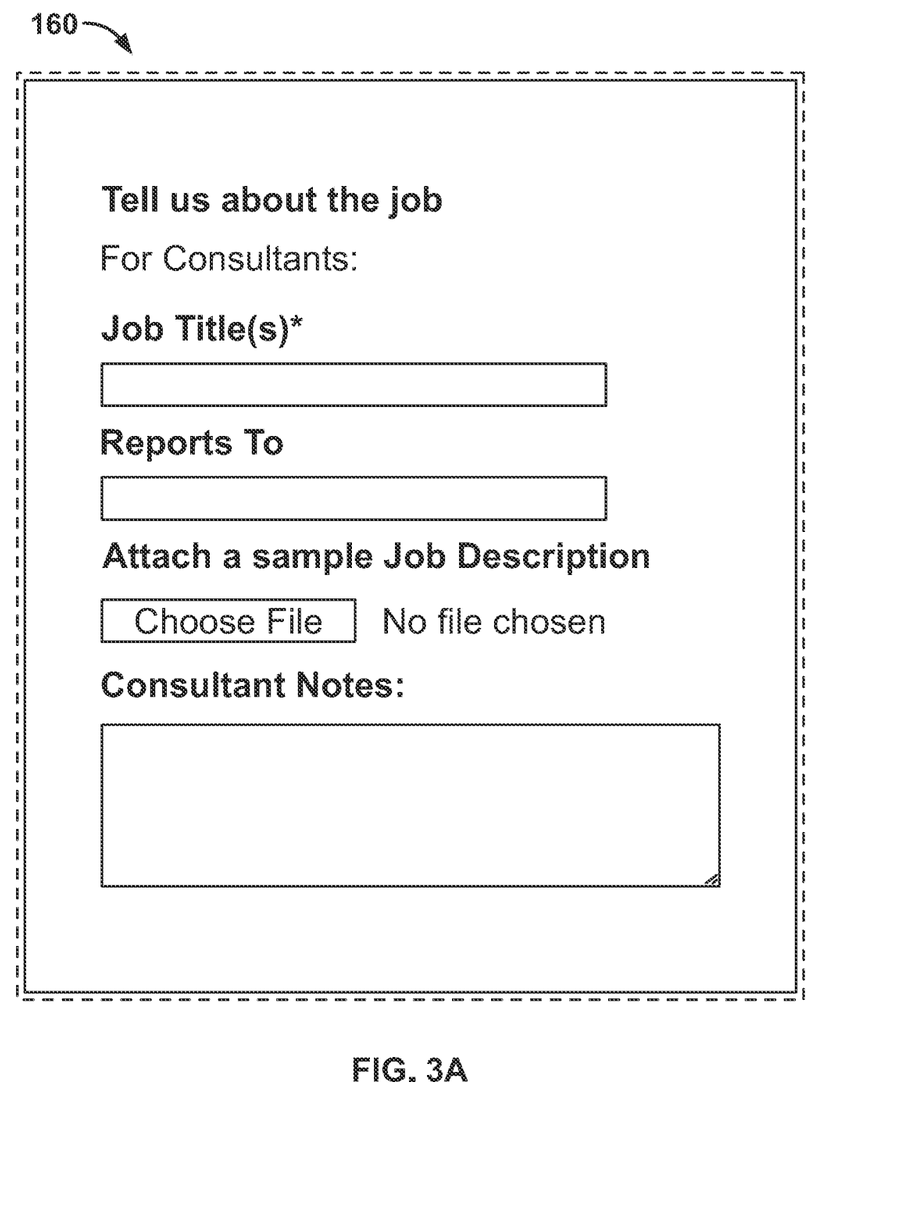
FIG. 3A is an example of an initial assessment of a Psychometric Benchmark Instrument questionnaire provided in accordance with the disclosed invention.
Figure 3B:
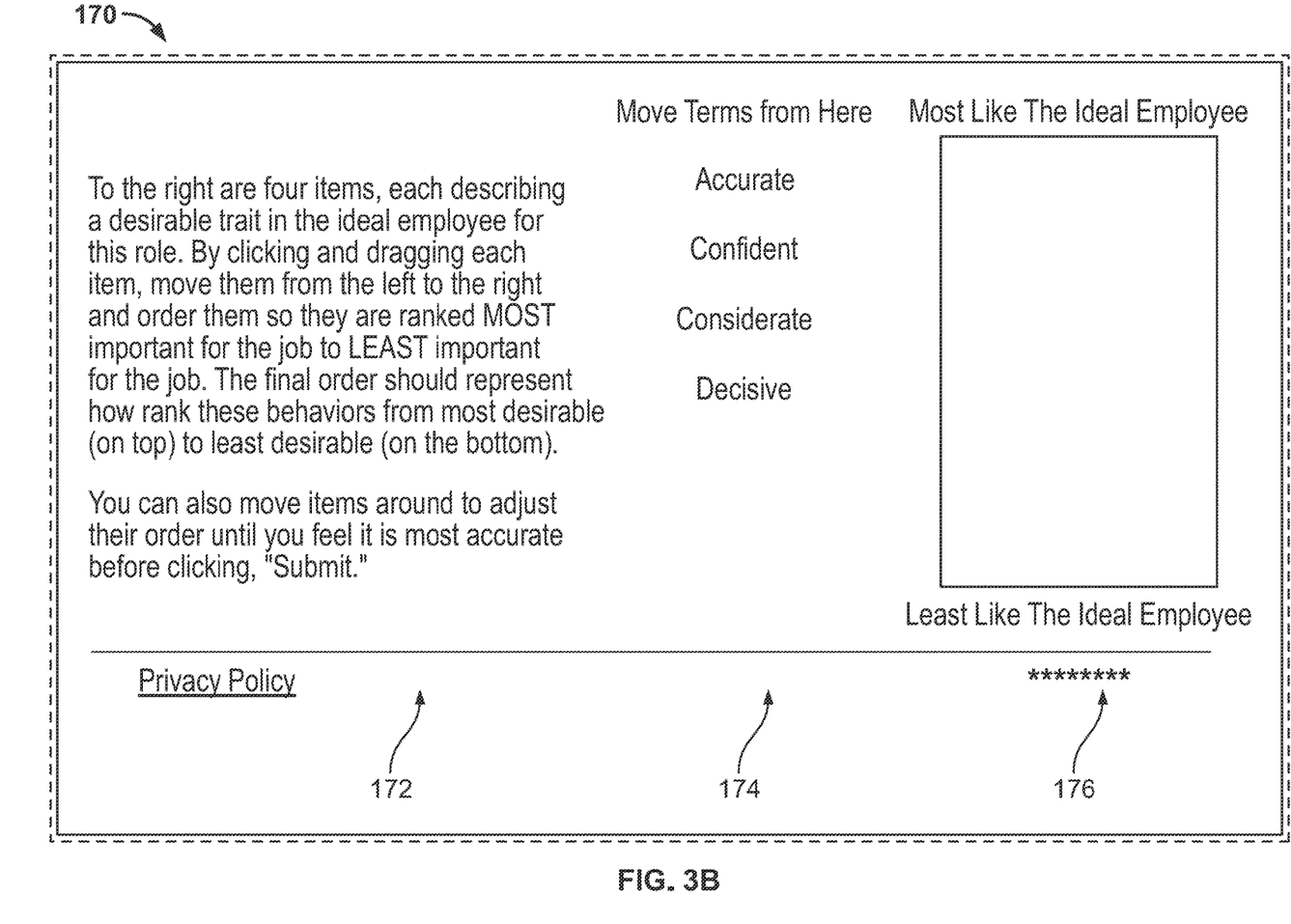
FIG. 3B is an example of a question of the Psychometric Benchmark Instrument questionnaire provided in accordance with the disclosed invention.
Figure 3C:
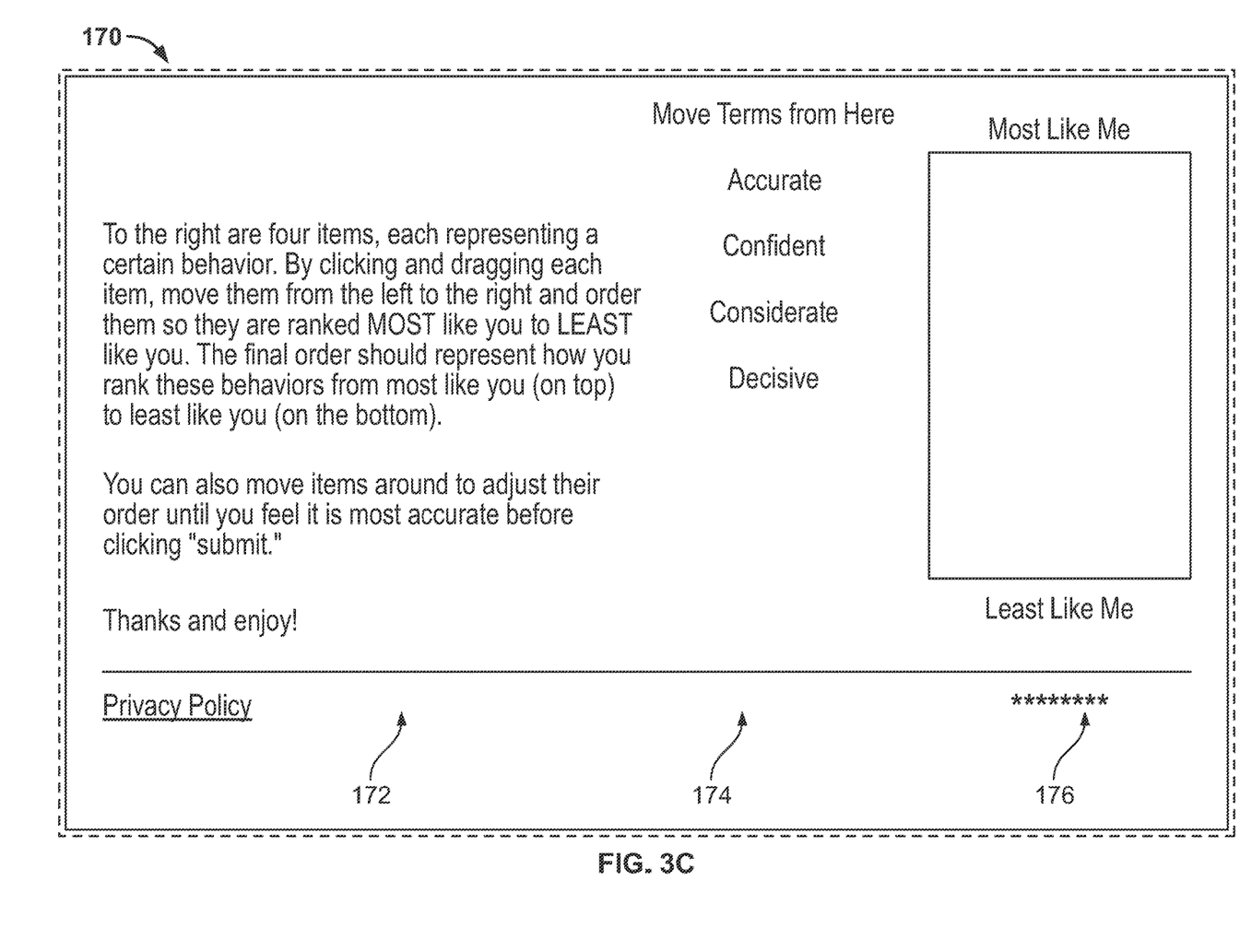
FIG. 3C is a further example of a question of the Psychometric Benchmark Instrument questionnaire provided in accordance with the disclosed invention.

FIGS. 3A-3C show an example of a PBI questionnaire that may be sent to stakeholders. The questionnaire may be electronically delivered to the stakeholders such that they may fill out the initial assessment 160 and the questions 170 electronically. As can be seen in FIG. 3A, an initial assessment 160 will ask for basic information regarding the job. The initial assessment 160 may include fillable boxes for information such as "Job Title", who the employee would report to ("Reports To"), and may allow for a "Job Description" to be attached to the assessment 160. The assessment 160 may also allow for additional "Consultant Notes" to be added. FIGS. 3B and 3C show examples of questions 170 that the stakeholders may answer. For example, FIG. 3B shows a question 172 regarding desirable traits of the job. In another column 174, the question 170 lists traits that the stakeholder may rank according to relevance to the specific job role. In a further column 176, the traits from the previous column 174 will appear ranked based on how the stakeholder's ranking. In order to rank the traits, the stakeholder may click and drag the traits around the computer window until an acceptable rank is achieved. FIG. 3C shows a similar question 170, but involving a ranking behaviors as opposed to traits.

For example, a benchmark may assess an individual candidate's fit, and make predictive statements, in a job/role in, for example, one of various areas. For example, analysis may be performed based on task and duty fit analysis based on the DISC theory created by Dr. William Marston at Harvard, so as to set an ideal score for the core four dimensions of behavioral fit: decisiveness, interactiveness, stability and conscientiousness.

For example, in decisiveness (problems), scoring may be performed to determine how decisive and agile does the employee need to be in order to make decisions in the role. More decisive roles (e.g., sales, law enforcement, field military operations) may require a more intuitive and quick response time to making important decisions with less time and information. In these roles, there may be less time and information available to make decisions. In less decisive, or more deliberate, roles (e.g., quality control, accounting, legal) the ideal employee may take more time to make more controlled and deliberate decisions, with more information gathering and less room for mistakes or corrections once the decision is acted upon.

In interactiveness (people), scoring may be performed to determine how interactive and social does the employee need to be in order to effectively execute their job responsibilities. In highly interactive roles, the employee may need to be more extraverted and outgoing (e.g., sales, leadership, persuasive tasks, public or customer-facing support roles). They may need to be naturally comfortable meeting new people and interacting with them in an effective manner. In less interactive roles (e.g., back-office, individual contributor roles) there may be less of a need for highly developed social skills. The individual can deliver the majority of their deliverables by working independently, remotely or with less interaction with a team, the pubic or customers.

In stability (pace), scoring may be performed to determine how agile or structured does the employee need to be in order to keep up with the pace of the work. In highly structured roles (e.g., auditors, analysts, forensics) the employee may have to take a slower pace, operating in a more structured and rigid environment and move at a slower pace. In less structured roles (e.g., sales, art, entertainment, EMS), there may be less stability, less predictability and the employee may need to be comfortable operating with more unknowns and less certainty.

In conscientiousness (procedures), scoring may be performed to determine how detailed and accurate does the employee need to be in order to fulfill their responsibilities. In highly detailed roles (e.g., accounting, legal, administrative), the tasks may require a high degree of accuracy and attention to detail. The role may center around the minutia of the equation. In less detailed roles (e.g., sales, entrepreneurism, creative work), there may be a lesser demand for such attention to detail and "in-the-box" thinking. The ideal employee may be free to focus on the higher-order "big-picture" aspects of the work, rather than the detailed specifics.

In engagement and motivation fit, scoring may be performed to determine how, for example, based on Eduard Spranger's model of motivation and engagement, to set an ideal level of motivation on each of one more dimensions, for example:

Aesthetic: How motivated is the employee to achieve balance and harmony in their life, and the environment in which they work? To what degree does the work or culture reward an individual's motivation to achieve such a balance, or create balance in world as a result of the work they do (e.g., work-life balance, artistic expression, green initiatives, harmoniousness among co-workers)?

Economic: How motivated is the employee to drive a higher Return on Investment of available resources? To what degree does the work and culture reward an individual's motivation to grow resources, increase value, develop revenue as a result of the work they do (e.g., driving top-line revenue, increasing shareholder value, earning more money)?

Individualistic: How motivated is the employee to be independent and express themselves in unique ways? To what degree does the work and culture reward an individual's motivation to be independent, determine their own way or process of things, control their own destiny and create new ways of doing things (e.g., creating new approaches, pioneering experimental avenues, expressing uniqueness and individuality)?

Political: How motivated is the employee to take the lead and have authority and responsibility for the task or others? To what degree does the work or culture reward an individual's motivation to have responsibility for others, be followed and relied upon, be in charge or be giving ownership of the deliverable (e.g., Be the leader, coach others, guide the sale)?

Altruistic: How motivated is the employee to support others and give selflessly in order to benefit them, not themselves? To what degree does the work and culture reward an individual's motivation to care for the needs of others, support them, give without expectation of reward (e.g., supporting the team, donating their time, sacrificing for the good of others or the world)?

Regulatory: How motivated is the employee to ensure compliance with regulation? To what degree does the work and culture reward an individual's motivation to ensure rules exist and are followed, structures are defined and policies kept (e.g., writing guidelines, creating and enforcing rules and practices, organizing and structuring activities)?

Theoretical: How motivated is the employee to constantly learn and acquire new knowledge? To what degree does the work and culture reward an individual's motivation to grow their knowledge base, explore new topics and gain new understanding (e.g., research studies, theoretical experimentation, educational endeavors)?

Once a benchmark is created it is considered "provisional" until it has been used by sufficient employers, who offer feedback and aggregate data, to achieve a level of field validity where we can mark the benchmark as "validated" and then make it available for the public client-base. During this feedback and refinement process employees offer input that helps adjust the benchmark to a final degree of accuracy.

Figure 1:
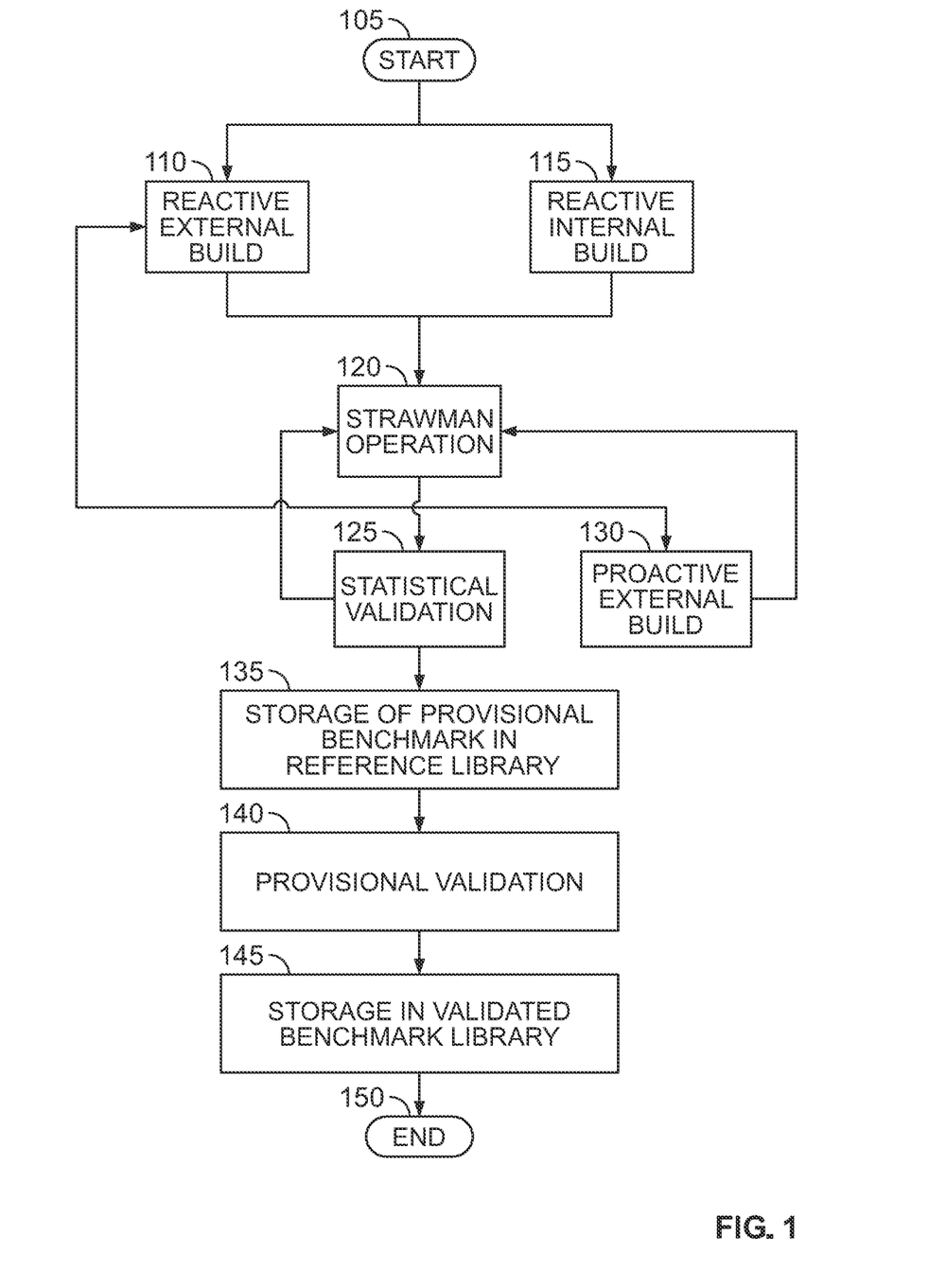
FIG. 1 is structured flow diagram illustrating a benchmark creation process provided in accordance with the disclosed invention.

FIG. 1 illustrates an example of a structured flow diagram illustrating a benchmark creation process provided in accordance with disclosed embodiments. As shown in FIG. 1, operations may begin at 105 and control may proceed to either 110 to perform a reactive external build of a benchmark or 115 to perform a reactive internal benchmark build. At 110, reactive external builds may be performed based on three options: trained business consultants (e.g., opinion, client stakeholders (benchmark instrument)) or client employees (e.g., profiling live 700+ people). At 115, reactive internal builds may be performed by personnel that examine a particular job, researches particulars of that job and assigns benchmark scores based on that examination and research.

Following completion of the reactive build options at 110-115, control proceeds to a strawman operation is performed to verification/validation of hypothetical benchmark scores at 120. Thereafter, the data generated by that operation are available for use by subsequent reactive external builds at 110, subsequent proactive external builds performed at 130 (which may use a pool of consultants that may offer benchmark scores), and subsequent statistical validation at 125 (which may involve accessing cohort scores for analysis and validation, e.g., sample size of 2,000+ profiles). Control may then proceed to 135, at which generated benchmark scores are stored in the finished provisional benchmark library. Thereafter, the provisional benchmark may be validated at 140, e.g., by validating, for example, fifty use cases. Control may then proceed to 145 for storage in one or more validated benchmark libraries, e.g., a private, client specific library or a public library (optionally including public benchmark libraries in resources with validated benchmark libraries being useful for complete and live job analysis. Control then proceeds to 150, at which operations end.

Figure 2:
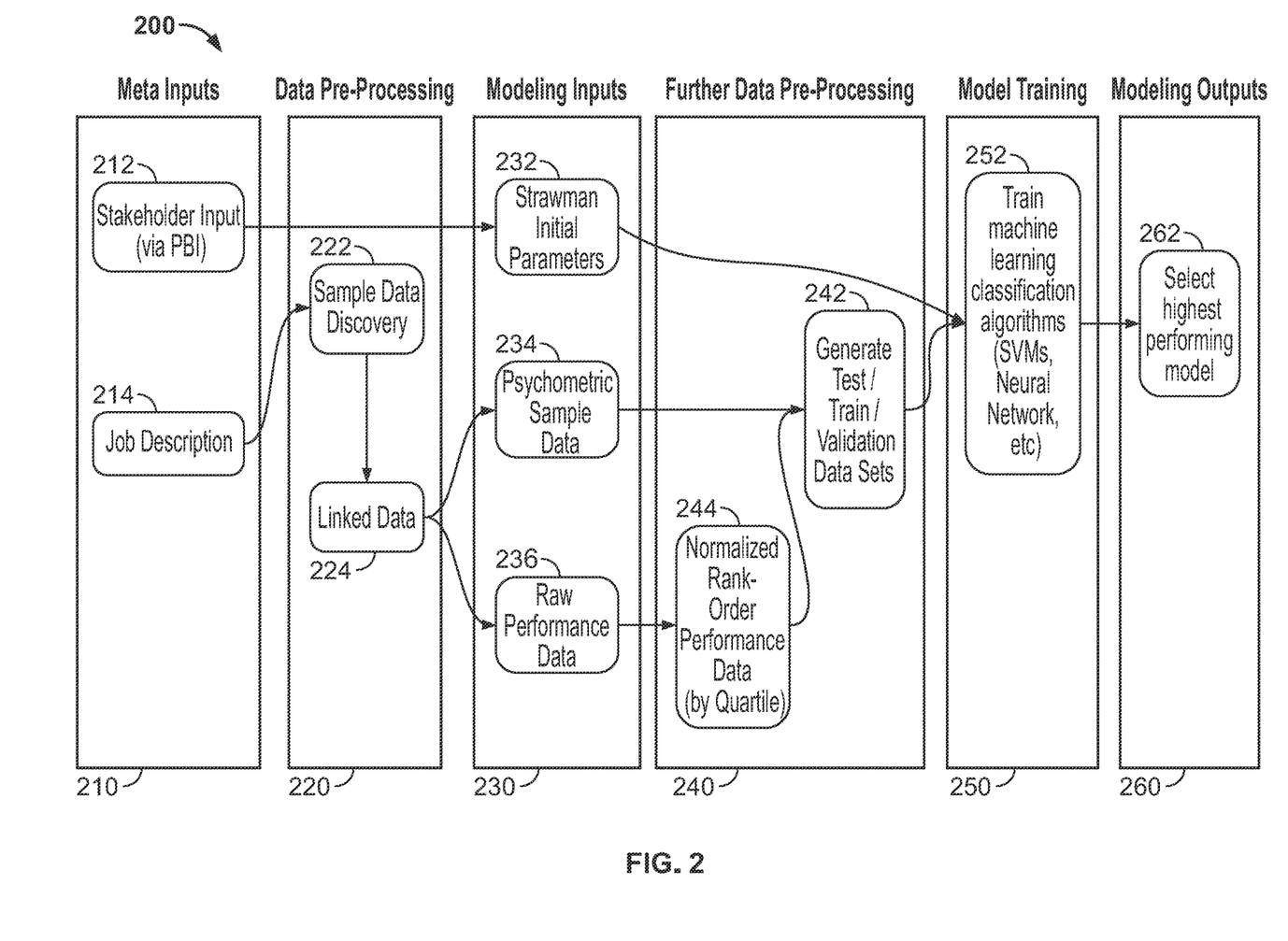
FIG. 2 is a flow chart illustrating an example of a model building process provided in accordance with the disclosed invention.

In accordance with at least some embodiments, a system and methodologies formulate an objective benchmark utilizing a reverse psychometric model. FIG. 2 is a flow chart illustrating an example of a model building process 200 provided in accordance with the disclosed invention. As shown in FIG. 2, the model building process 200 begins at operation 210 wherein meta inputs are provided via input or access as known in the art. The meta inputs may include stakeholder input data 212 and/or job description data 214. Following completion of the operations at 210, control proceeds to operation 220, which pre-processes the meta data provided, in particular pre-processing the job description data 214. The job description data 214 may pre-processed to perform sample data discovery 222. Further, in operation 220, the sample data discovery 222 may be utilized to generate linked data 224.

The generation of the linked data 224 may be executed via program code in the form of computer-executable instructions or data structures and which can be accessed by a general purpose or special purpose computer. The following pseudo code provides an example of the execution of the generation of the linked data 224:

```
procedure generate_linked_employee_record (employee E, job J, assessments A):
    AnonymousEmployeeRecord = Object( )
    # Attach employee's raw performance score, which is arbitrary per company
    AnonymousEmployeeRecord.raw_peformance_score =E.raw_peformance_score
    # Attach raw values for each complete assessment
    for each assessment in A:
        if assessment.complete:
            for each subscore in assessment.scores:
                AnonymousEmployeeRecord.set(subscore.name, subscore.value)
    # Only attach proficiency levels for relevant skills and competencies per job
    for skill in J.skills:
        if skill in E.skills:
            AnonymousEmployeeRecord.set(skill.name,
            E.skills.get(skill).proficiency_level)
        else:
            AnonymousEmployeeRecord.set(skill.name, None)
    return AnonymousEmployeeRecord
```

Thereafter, control proceeds to operation 230, during which modeling inputs is performed, e.g., the stakeholder input 212 may be used as modeling inputs to generate strawman initial parameters 232. Likewise, at 230, the linked data 224 from operation 220 of the data pre-processing may be used as modeling inputs for psychometric sample data 234 and raw performance data generation 236.

Thereafter, the model building process 200 may proceed to operation 240, wherein further data pre-processing is performed e.g., the psychometric sample data 234 from operation 230 of the modeling inputs may be used to generate test/train/validation data sets 242. Also at operation 240, the raw performance data 236 may be used to generate normalized rank-order performance data (by quartile) 244. Thereafter, the model building process 200 may perform model training at operation 250, wherein the strawman initial parameters 232 from operation 230 may be used for the model training at operation 250, wherein machine learning classification algorithms may be trained 252 using various algorithms, e.g., Support Vector Machines (SVMs), Neural Network, etc. The model training at 250 may also be informed by test/train/validation sets generated 242 in the further data pre-processing of operation four 240 based on psychometric sample data 234 and normalized rank-order performance data (generated, for example, by quartile) 244 based on the raw performance data modeling inputs 236.

The generation of the normalized rank-order performance data 244 may be executed via program code in the form of computer-executable instructions or data structures and which can be accessed by a general purpose or special purpose computer. The following pseudo code provides an example of the execution of the generation of the normalized rank-order performance data 244:

```
procedure normalize_partition_performance_data (companies C):
    TopPerformers = List( )
    BottomPerformers = List( )
    for all company in C:
        S = List( )
        while company.raw_peformance_data is not empty:
            AnonymousEmployeeRecord = company.raw_peformance_data.pop( )
            S.push(AnonymousEmployeeRecord)
        SampleSize = S.size( )
        S.sort(key='raw_peformance_score')
        # Add top quartile based on Company's performance score
        TopQuartileIndex = int(SampleSize * 0.25)
        TopPerformers.append(S[0 : TopQuartileIndex])
        # Add bottom quartile based on Company's performance score
        BottomQuartileIndex = int(SampleSize * 0.75)
        BottomPerformers.append(S[BottomQuartileIndex : SampleSize-1])
    return TopPerformers, BottomPerformers
```

In accordance with at least some disclosed embodiments, the model building process 200 may further proceed to a further modelling input operation 260, wherein, based on the trained machine learning classification algorithms 252, several algorithms are assessed and the most performant algorithm is selected as 262, as measured by the Receiver Operating Characteristics (ROC). Of particular note, the second data pre-processing stage of operation 240 illustrated in FIG. 2 includes transformation of any performance data into rank-ordered data 244, whereby further classification of the top and bottom quartiles of data may be performed as a binary outcome of job fit.

The training of machine learning classification algorithms 252 may be executed via program code in the form of computer-executable instructions or data structures and which can be accessed by a general purpose or special purpose computer. The following pseudo code provides an example of the execution of the generation of a list of trained and validated machine learning classification algorithms 252:

```
procedure train_predictive_models (attributes Strawman, employees TopPerformers,
employees BottomPerformers):
    # Build various training models from library of Machine Learning Classification
Algorithms
    M = List( )
    for all learning_model in ClassifcationAlgorithms:
        # Initialize each model with expert chosen Strawman parameters
        training_model = learning_model(bootstrap_parameters=Strawman)
        # Train each model on binary outcomes of top and bottom performers
        trained_model = training_model.fit(positive_case=TopPerformers.training_data,
negative_case=BottomPerformers.training_data)
        # Validate trained model against test data
        validation_scores = cross_val_score(trained_model,
positive_case=TopPerformers.testing_data,
negative_case=BottomPerformers.testing_data)
        # Select models which are better than random for further review
        if validation_scores.mean( ) > 0.5:
            M.push(trained_model)
# Return list of validated machine learning classification algorithms
return M
```

The determination of the optimal machine learning classification model 262 may be executed via program code in the form of computer-executable instructions or data structures and which can be accessed by a general purpose or special purpose computer. The following pseudo code provides an example of the execution to determine the optimal machine learning classification model from a list of validated models 262:

```
procedure determine_optimal_model(models M):
    # Determine the highest qualify validated model using Receiver
Operating Characteristics
    MaxAUC = 0
    OptimalModel = None
    for all validated_model in M:
        if validated_model.auc > MaxAUC:
            MaxAUC = validated_model.auc
            OptimalModel = validated_model
    # Return the final OptimalModel which contains human readable
features and can score job seekers by fit
    return OptimalModel
```

The machine learning classification algorithms 252 may utilize feedback from feedback sources in order to periodically receive feedback and further revise and refine the models discussed above. The feedback sources may include, for example, the subject matter expert feedback, statistical comparisons and use of the PBI discussed above or other sources. The machine learning classification algorithms 252 may result in improved models which may more accurately assess a candidate's personality fit for the job.

In at least some embodiments, the system may periodically retrain the predictive psychometric models discussed above using additional real-world binary outcome data provided by hiring managers through the use of the ATS system stages 310 discussed below. Specifically, hiring managers may be surveyed to verify the performance of applicants placed in the "Hired" stage 320 and determine new hires who are top and bottom performers. This additional data may be then be used to produce an improved psychometric model through the same process used to build the initial model, e.g. model building process 200.

In accordance with at least one embodiment, the disclosed embodiments may enable the ability to dynamically track employment candidate scores in association with a particular job/role. Such an implementation may enable dynamically scoring employment candidates through a "guided iterative input" process for a hiring manager.

Figure 4:
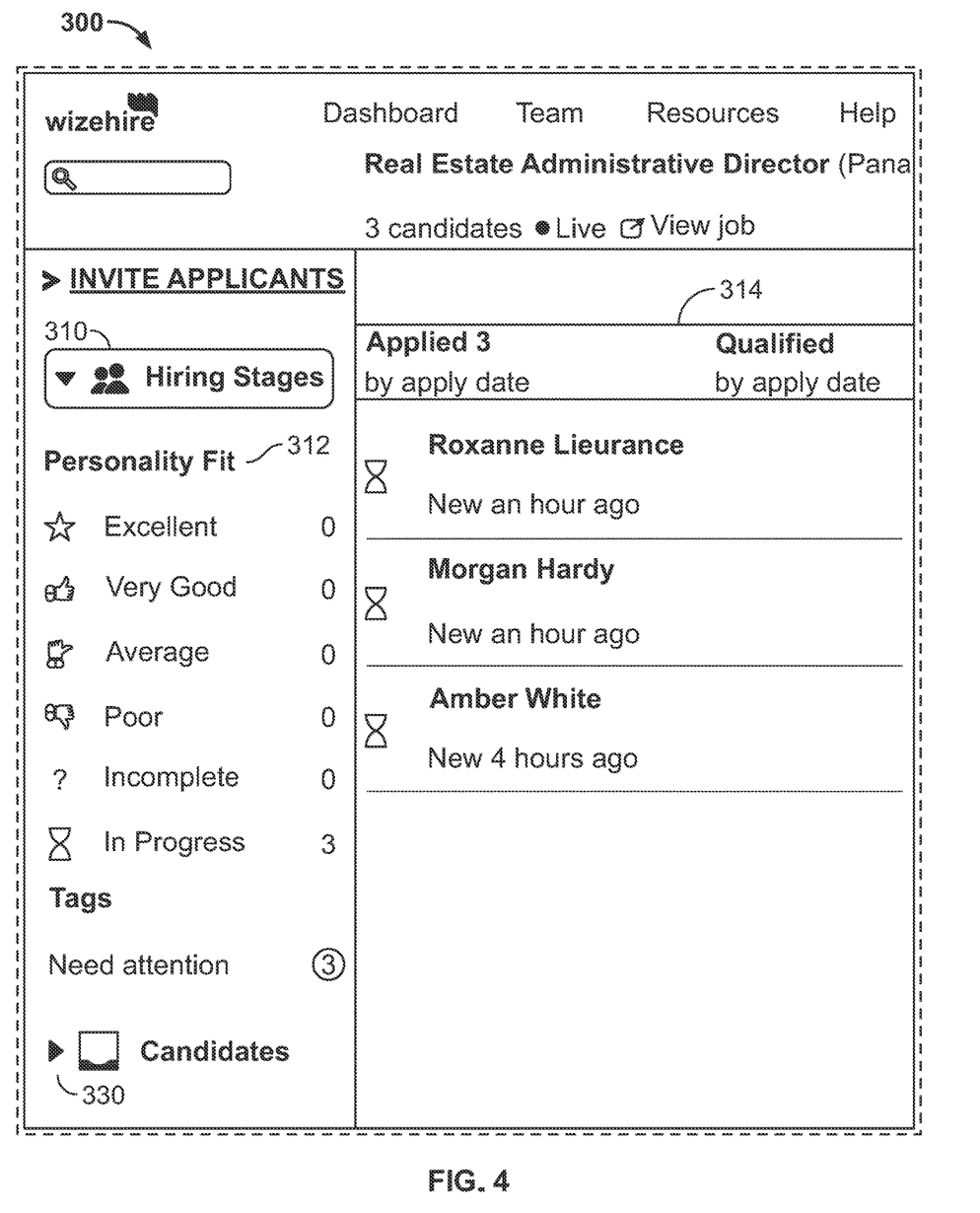
FIG. 4 is an example of an Applicant Tracking System dashboard provided in accordance with the disclosed invention.
Figure 5:
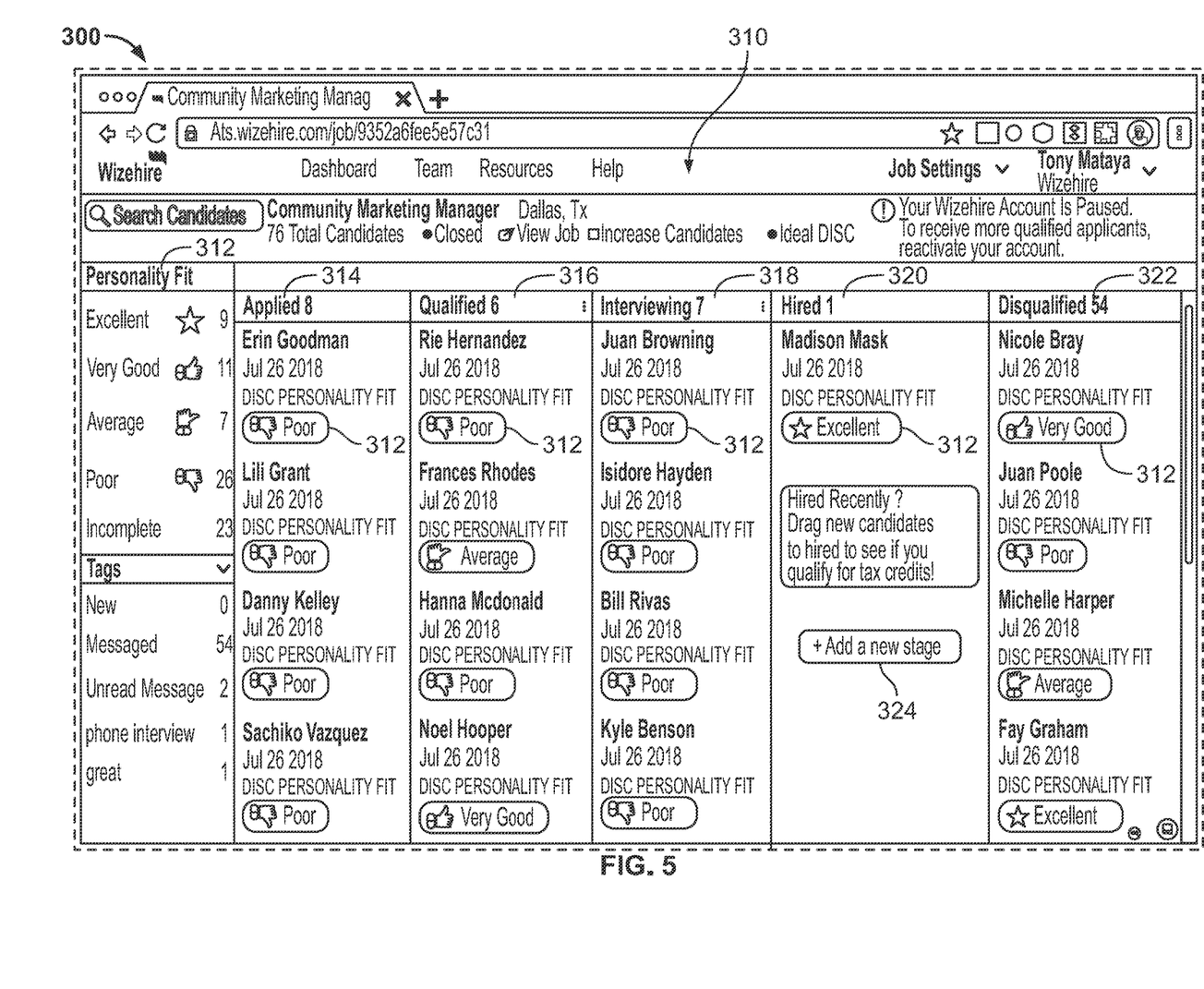
FIG. 5 is an example of the Applicant Tracking System dashboard provided in accordance with the disclosed invention.

Conventional Applicant Tracking System (ATS) (example of an ATS dashboard 300 is shown in FIGS. 4 and 5) software is known for assisting hiring managers electronically organize and manage the flow of applicants for a given job through various stages of the hiring process. Its primary objective is to organize large numbers of applicants into stages or phases of the selection process.

Not unlike Customer Relationship Management (CRM) software, which is designed to coordinate and track sales and customer information, an ATS achieves the same function only for employment applicants. It is conventionally known to include additional features like resume sorting and screening, where the software makes some determination of fit based strictly on keyword searches in the resume (job titles, qualifications, schools, experience, etc.).

However, recently Applicants have learned to skew the accuracy of such ranking systems by including key words in their resume designed to help them rank higher (e.g., including the term "Search Engine Optimization (SEO)" in web-based marketing). Thus, the principal function of conventional ATSs has been strictly to help organize a company's recruitment efforts, not assist the hiring manager in deciding who the optimal candidate actually is. Thus, conventional ATSs improve efficiency not accuracy.

To the contrary, in accordance with at least some disclosed embodiments, an ATS is provided that tracks employment candidates but also contributes to the actual hiring decision by screening and ranking on a plurality of levels of qualification.

In implementation, this may involve moving candidates through a defined workflow wherein they are scored against a benchmark standard in each stage of the process. Such an implementation enables the ability to separate the hiring and benchmark comparison process down into smaller, more easily discernable actions, that score each candidate in a variety of functional areas relevant to a particular job. In doing so, the ATS provided by the disclosed embodiments goes beyond simply a means of tracking, to a means of screening and ranking and a decision-support tool designed to help the hiring manager make a better hiring decision.

The system operates by dividing the recruitment process into various and a plurality of customizable "stages" 310. Each stage of the plurality of stages 310 is sequential and the flow is configured to assess a candidate's fit in each stage of the plurality of stages 310 and then move them to the next, to be evaluated against that stage's unique qualification. In each stage, for example, a candidate may receive a score on a 1-5 scale; as they progress through the plurality of stages 310, the scores for each stage may be aggregated, which effects the overall ranking of any individual candidate relative to the other candidates.

By the time a candidate reaches a final stage of the plurality of stages 310, the data generated by the ATS and displayed on the ATS dashboard 300 (an example being illustrated in FIGS. 4 and 5) have enabled the hiring manager to make numerous "micro-evaluations." In the example shown in FIGS. 4 and 5, one stage of the recruitment process may include a personality fit 312 assessment. Such micro-evaluations to be performed by the hiring manager may include evaluating a candidate based on their personality fit for the position. These micro-evaluations are designed to break the overall lengthy and burdensome process of hiring into easy-to-digest, quick judgments. The ATS designed in accordance with the disclosed embodiments may track these judgments (assessments) for the hiring manager and automatically compare all candidates against each other relative to their overall rank. The ATS may also aggregate the personality fit for each candidate so as to indicate the total number of candidates who fall into categories of the personality fit assessment 312, such as "Excellent", "Very Good", "Average", "Poor", and "Incomplete", as shown in FIGS. 4 and 5. Moreover, as shown in FIG. 3, a listing of the candidates may be accessed via a drop-down menu 330 or via a main candidate column including an "Applied" stage 314 including more detailing information of each candidate.

For example, consider the following process. Candidate Doe applies for a job and is asked to complete a personality profile assessment 312 associated with a first stage 314 of the plurality of stages 310, which could be an "Applied" stage 314, in the ATS in order to ascertain a personality fit. The software compares the results of that personality profile against a benchmark formulated as explained above and sorts stage one candidates as one of an: "Excellent", "Very Good", "Average", "Poor", fit for the job (based on the personality assessment 312), as shown in FIGS. 4 and 5.

Subsequently, the hiring manager is provided with data on the ATS dashboard 300 so that she can examine candidates in a subsequent stage of the plurality of stages 310 (ideally based on top-down ranking, and moves them to stage two, where she examines the candidates resume). On the ATS Dashboard 300 screen may be displayed a ranking bar that allows the hiring manager to rate the candidate's resume on a 1-5 scale. For example, as shown in FIG. 5, the stages 310 may include a "Qualified" stage 316.

Thereafter, once the ATS registers a new score in stage two 316 of the plurality of stages 310 (i.e., resume rating as shown as a "Qualified" stage 316 in FIG. 5), the system may automatically incorporate that data into the overall ranking and adjust the individual candidates ranking among all other candidates.

Subsequently, the ATS system may be configured to enable the hiring manager to move the candidate to stage three 318 of the plurality of stages 310, shown as an "Interviewing" stage 318 in FIG. 5. Based on the interview, the hiring manager can rate the candidate on the familiar 1-5 scale. As the system registers a new score in stage three 318, it is configured to incorporate that data into the overall ranking and adjust the individual candidates ranking among all other candidates.

At each stage 310, the system incorporates the rating for that stage 310 and automatically updates the cumulative rankings of all candidates. For example, after the vetting process is complete, the hiring manager may move the candidates to a "Hired" stage 320 or a "Disqualified" stage 322. The ATS system also enables the hiring manager to move candidates through however many stages 310 that may exist (the system may come with a predetermined set of stages 310 but can be customized by the hiring manager to fit their unique hiring process). The hiring manager may add additional stages via an "Add a new stage" button 324 on the dashboard 300.

The unique aspect of this implementation of the disclosed embodiments modifies conventional technologies and capabilities to provide a single dynamic process that integrates numerous functions into one feedback system that support a more efficient and effective recruiting and hiring program.

Generated rankings may serve as predictions of candidate success in a position and may be significantly more accurate than traditional "key words" based screening because the presently used algorithms match not only "job" requirements and candidate skills, but are also based on historically successful candidate characteristics provided by the psychometric data. The attributes considered may include educational background, career trajectory, caliber of research produced and business outcomes generated by successful candidates. These factors may be assigned weights based on their predictive value and incorporated into the algorithm.

In accordance with the disclosed embodiments, functionality may be theoretically considered to be implemented in one or more of a backend, middleware, and a frontend. Moreover, in such an implementation, one or more of the system functionality may be implemented on one or more servers coupled to one or more public and/or private communication networks, e.g., the Internet. As a result, it should be appreciated that the functionality disclosed herein and interaction with the system subcomponents may be accessed via one or more computers, e.g., a mobile device such as a mobile smartphone, a PDA, a personal computer, a multimedia computer, a laptop, and the like. Additionally, or alternatively, the functionality disclosed herein may be implemented in whole or in part as a software application, e.g., a mobile application, which is a software program or application designed to run on computers such as smartphones, tablet computers and other mobile devices.

The software application may communicate with one or more databases running on such servers to provide to enable storage of uploaded data from candidates as well as storage of datasets for download to candidates as part of the skills testing subcomponent one or more communication networks. Such networks may include any type of communication network, such as a cellular communication network, including but not limited to various generations of cellular network technology (2G-5G) Global System for Mobile Communications (GSM), Wideband Code Division Multiplex Access (WCDMA), Code Division Multiplex Access (CDMA), or Time Division Multiplex Access (TDMA), General Packet Radio Services (GPRS), Universal Mobile Telephone System (UMTS). Additionally, such networks can also be implemented as a combination of two or more technologies i.e., a hybrid network. Further, the network(s) may also include generic Internet access using any transport methods.

The functionality disclosed herein may be implemented in various configurations using computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions.

Accordingly, although not illustrated, it should be understood that the functionality may be implemented using a server that provides or includes a processor connected to a user interface, computer readable memory and/or other data storage and a display and/or other output device. Computer executable instructions and data used by a processor may be stored in the computer readable memory included in the server or implemented with any combination of read only memory modules or random access memory modules, optionally including both volatile and nonvolatile memory.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

Further, it should be understood that the functionality described in connection with various described subcomponents of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Although certain illustrative embodiments have been described in detail above, variations and modifications exist within the scope and spirit of this disclosure as described and as defined in the claims included in this application. Moreover, it should be understood that any recitation of examples of pseudo code are mere examples of how the disclosed functionality may be executed via program code in the form of computer-executable instructions or data structures and which can be accessed by a general purpose or special purpose computer. Thus, these recitations of pseudo code are not limiting to the disclosed embodiments but merely enabling of the disclosed inventive concepts.

What is claimed is:

1. A method for more holistically analyzing multiple qualifications and capabilities of one or more employment candidates for hiring by a hiring entity by performing analysis and hiring decisions based on comprehensive, objective data pertaining to candidates' interests, skills, experience, qualifications and capabilities as well as identification of candidate psychometric data, the method comprising:
automatically determining, via at least one processor connected to a user interface and/or computer readable memory, one or more personality traits of the one or more employment candidates using one or more psychometric tools to identify and measure presence of the one or more personality traits in the one or more employment candidates, wherein the one or more psychometric tools is configured to generate at least one objective quantitative representation of the one or more personality traits, wherein the at least one objective quantitative representation is recorded in a trait database, wherein the determining via the at least one processor is configured to utilize the trait database; and
automatically analyzing, via at least one processor, the qualifications and capabilities of the one or more employment candidates in a manner to match the one or more employment candidates to specific job roles by utilizing psychometric data generated by the one or more psychometric tools and a benchmarking process, wherein the benchmarking process includes creation of at least one benchmark which includes the psychometric data and obtaining feedback from subject matter experts in order to validate the at least one benchmark, wherein the feedback from subject matter experts includes input data obtained regarding ideal personality traits from sources including at least one source external to the one or more employment candidates and external to the hiring entity for comparison with the one or more personality traits of the one or more employment candidates, wherein the feedback and the outcome data are recorded in a feedback and outcome data database, and wherein the analyzing via the at least one processor is configured to utilize the feedback and outcome data database prior to hiring the one or more employment candidates, wherein the analysis of the qualifications and capabilities of the one or more employment candidates includes comparing the psychometric data generated by the one or more psychometric tools to the at least one benchmark generated by the benchmarking process to arrive at an overall fit score, wherein the benchmarking process includes creating the at least one benchmark utilizing a reverse psychometric model, and wherein the reverse psychometric model includes:
  initially providing meta inputs including at least one of stakeholder input and job description data;
  subsequently generating modeling inputs based on the meta inputs, the modeling inputs including strawman initial parameters in response to the meta input being stakeholder input, the modeling inputs further including psychometric data and raw performance data in response to the meta input being job description data;
  and subsequently modeltraining machine learning classification algorithms based on at least one of the strawman initial parameters, the psychometric data, and the raw performance data.

2. The method of claim 1, wherein the obtaining of feedback from subject matter experts is provided by:
  performing at least one of a reactive external build and a reactive internal build; and
  performing statistical comparison.

3. The method of claim 2, wherein the performance of the reactive external build includes at least one of (i) utilizing a psychometric benchmark instrument to receive input from stakeholders regarding at least one personality trait of the one or more personality traits in the specific job role in order to create at least one provisional benchmark score for the at least one personality trait, and (ii) at least one of trained business consultants and client employees providing input on at least one personality trait of the one or more personality traits that determines candidate success in the specific job roles in order to create at least one provisional benchmark score for the at least one personality trait.

4. The method of claim 3, wherein the performance of the reactive internal build includes examining the specific job role, researching particulars of the specific job role, and assigning at least one provisional benchmark score for a corresponding personality trait of the one or more personality traits based on the examination and research.

5. The method of claim 4, wherein the creation of the at least one benchmark further includes performing a strawman operation after the obtaining feedback to validate the at least one provisional benchmark score, wherein the performing of the strawman operation generates strawman data configured to be utilized by subsequent reactive external builds for additional personality traits of the one or more personality traits.

6. The method of claim 5, wherein the performance of the statistical comparison includes determining at least one statistically significant correlation between the at least one personality trait and job performance in the specific job role utilizing personality profile data of at least one cohort of top and bottom performers for a corresponding job role and updating the at least one provisional benchmark score based on the statistical comparison.

7. The method of claim 6, wherein, after the obtaining of feedback from subject matter experts and the statistical comparison, the creation of the at least one benchmark further includes validating the at least one provisional benchmark score based on a predetermined minimum amount of iterations of the obtaining of feedback from subject matter experts and the statistical comparison in order to determine at least one validated benchmark score.

8. The method of claim 1, wherein the creation of the at least one benchmark further includes: pre-processing the job description data after providing the meta inputs and before generating the modeling inputs in order to perform sample data discovery that is utilized to generate linked data, the linked data being utilized as modeling inputs for the psychometric data and raw performance data.

9. The method of claim 8, wherein the creation of the at least one benchmark further includes: further data pre-processing including pre-processing the raw performance data to generate normalized rank-order performance data, and including pre-processing the psychometric sample data and the generated normalized rank-order performance data to generate at least one of test, train, and validation data sets.

10. The method of claim 1, wherein the one or more psychometric tools includes performing at least two psychometric tests with the same group of test takers.

11. The method of claim 1, wherein the creation and validating of the at least one benchmark includes receiving feedback from at least 10 respondents for each of decisiveness, interactiveness, stability, and conscientiousness.

12. A system for more holistically analyzing multiple qualifications and capabilities of one or more employment candidates for hiring by a hiring entity by performing analysis and hiring decisions based on comprehensive, objective data pertaining to candidates' interests, skills, experience, qualifications and capabilities as well as identification of candidate psychometric data, comprising:
  a non-transitory computer-readable storage medium with instructions which, when executed by a computer, include:
    automatically determining, via at least one processor connected to a user interface and/or computer readable memory, one or more personality traits of the one or more employment candidates using one or more psychometric tools to identify and measure presence of the one or more personality traits in the one or more employment candidates, wherein the one or more psychometric tools is configured to generate at least one objective quantitative representation of the one or more personality traits and being recorded the at least one objective quantitative representation in a validation database, and wherein the determining via the at least one processor is configured to utilize the validation database; and
    automatically analyzing, via at least one processor, the qualifications and capabilities of the one or more employment candidates in a manner to match the one or more employment candidates to specific job roles by utilizing psychometric data generated by the one or more psychometric tools and a benchmarking process, wherein the benchmarking process includes creation of at least one benchmark which includes the psychometric data and obtaining feedback from subject matter experts in order to validate the at least one benchmark, wherein the feedback from subject matter experts includes input data obtained regarding ideal personality traits from sources including at least one source external to the one or more employment candidates and external to the hiring entity for comparison with the one or more personality traits of the one or more employment candidates, wherein the feedback and the outcome data are recorded in a feedback and outcome data database, and wherein the analyzing via the at least one processor is configured to utilize the feedback and outcome data database prior to hiring the one or more employment candidates, wherein the analysis of the qualifications and capabilities of the one or more employment candidates includes comparing the psychometric data generated by the one or more psychometric tools to the at least one benchmark generated by the bench marking process to arrive at an overall fit score, wherein the bench marking process includes creating the at least one benchmark utilizing a reverse psychometric model, and wherein the reverse psychometric model includes:
  initially providing meta inputs including at least one of stakeholder input and job description data;
  subsequently generating modeling inputs based on the meta inputs, the modeling inputs including strawman initial parameters in response to the meta input being stakeholder input, the modeling inputs further including psychometric data and raw performance data in response to the meta input being job description data; and
  subsequently model training machine learning classification algorithms based on at least one of the strawman initial parameters, the psychometric data, and the raw performance data.

13. The system of claim 12, wherein the obtaining of feedback from subject matter experts is provided by: performing at least one of a reactive external build and a reactive internal build; and performing statistical comparison.

14. The system of claim 13, wherein the performance of the reactive external build includes at least one of (i) utilizing a psychometric benchmark instrument to receive input from stakeholders regarding at least one personality trait of the one or more personality traits in the specific job role in order to create at least one provisional benchmark score for the at least one personality trait, and (ii) at least one of trained business consultants and client employees providing input on at least one personality trait of the one or more personality traits that determines candidate success in the specific job roles in order to create at least one provisional benchmark score for the at least one personality trait.

15. The system of claim 14, wherein the performance of the reactive internal build includes examining the specific job role, researching particulars of the specific job role, and assigning at least one provisional benchmark score for a corresponding personality trait of the one or more personality traits based on the examination and research.

16. The system of claim 15, wherein the creation of the at least one benchmark further includes performing a strawman operation after the obtaining feedback to validate the at least one provisional benchmark score, wherein the performing of the strawman operation generates strawman data configured to be utilized by subsequent reactive external builds for additional personality traits of the one or more personality traits.

17. The system of claim 16, wherein the performance of the statistical comparison includes determining at least one statistically significant correlation between the at least one personality trait and job performance in the specific job role utilizing personality profile data of at least one cohort of top and bottom performers for a corresponding job role and updating the at least one provisional benchmark score based on the statistical comparison.

18. The system of claim 17, wherein, after the obtaining of feedback from subject matter experts and the statistical comparison, the creation of the at least one benchmark further includes validating the at least one provisional benchmark score based on a predetermined minimum amount of iterations of the obtaining of feedback from subject matter experts and the statistical comparison in order to determine at least one validated benchmark score.

19. The system of claim 12, wherein the creation of the at least one benchmark further includes: pre-processing the job description data after providing the meta inputs and before generating the modeling inputs in order to perform sample data discovery that is utilized to generate linked data, the linked data being utilized as modeling inputs for the psychometric data and raw performance data.

20. The system of claim 19, wherein the creation of the at least one benchmark further includes: further data pre-processing including pre-processing the raw performance data to generate normalized rank-order performance data, and including pre-processing the psychometric sample data and the generated normalized rank-order performance data to generate at least one of test, train, and validation data sets.

* * * * *